Oct. 7, 1941.   K. HENKELS   2,257,954

SLIDE-FASTENER LINK

Filed March 4, 1940

Inventor
Kurt Henkels
By  by Christy and Wharton
Attorneys

Patented Oct. 7, 1941

2,257,954

UNITED STATES PATENT OFFICE 2,257,954

SLIDE-FASTENER LINK

Kurt Henkels, Wuppertal, Germany

Application March 4, 1940, Serial No. 322,067
In Germany March 4, 1939

3 Claims. (Cl. 24—205)

This invention relates to slide-fastener links which are provided for coupling purposes with an elevation and a depression, as also two fixing lugs whereby they are fixed to the edge of a band. Such slide-fastener links have in most instances hitherto been punched from steel strip, the gauge of which corresponds to the thickness of the fastener link. By this method, the depression is first stamped with a stamping tool, after which the fastener link is punched out.

In spite of the adoption of a very accurate system of guiding the steel strip, and even with most exact tool design, it frequently occurs that the elevations are not stamped directly in the centre of the punched-out fastener link; this by reason of the fact that when stamping the comparatively thick steel strip the material tends towards a slight flow. Should, however, the elevation, respectively the depression, of the individual fastener links not be in the centre, the finished slide fastener will not function properly.

In order to obtain more accurate fastener links and to facilitate the manufacture of such slide-fastener links, while simultaneously economising in material and thereby reducing the cost of the fastener, according to the present invention it is now proposed that the fastener links shall be hollow drawn from the sheet, so that thereby each separate link represents a small hollow body. The border of this hollow body can at the same time be beaded inwards to avoid sharp edges. Whereas, for example, it has been the practice to punch out the smallest fastener links from a sheet of 0.90 mm. (.0354 in.) gauge, according to this invention a sheet of only 0.25 mm. (.0098 in.) gauge is utilised, which is drawn in such manner as to produce a band having a total height of 0.90 mm. (.0354 in.). If several operations are employed when producing the fastener link, the accomplishment of very accurate work is rendered possible. It has, in fact, already been proposed that the individual links of a slide fastener should be bent from thin sheet. But these links bent into stirrup form in one plane are very weak, for which reason and above all else the coupling tongues easily become deformed, and the fastener is rendered useless. Apart from this, however, the links cannot be produced by bending with such exactness as when they are drawn with the aid of accurate dies.

The invention is clearly illustrated in the accompanying drawing, which, representing a such enlarged example of construction, forms a part of this specification and in which—

Figure 1:
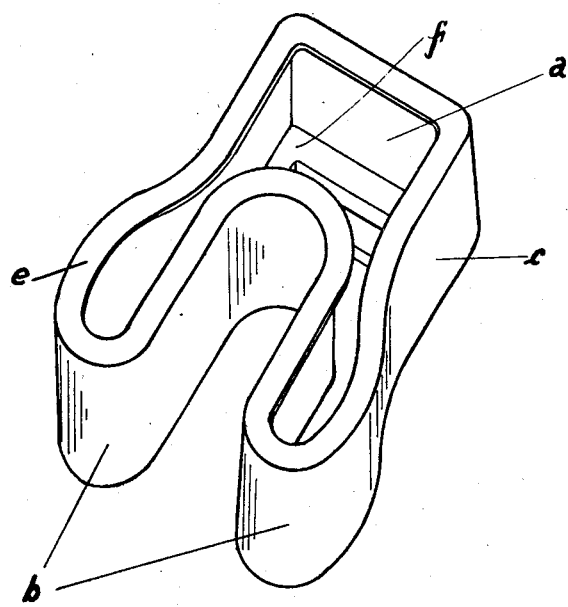
Figure 2:
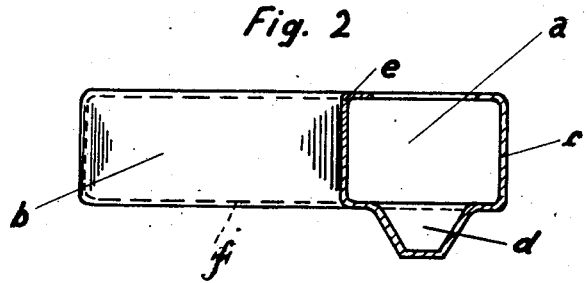

Fig. 1 is a pictorial projection, and
Fig. 2 is a sectional elevation of the improved slide-fastener link.

The fastener link is deep or hollow-drawn from a sheet. It is of general U-shape, and consists of a basal web $f$, from which, on one side, and in the bend of the U, rises a coupling portion $d$; and, on the other side, peripherally, rises the border wall $c$. The height of the border wall $c$ corresponds to the thickness of fastener links as hitherto manufactured. The arms $b$ of the U-shaped article become fixing lugs, by which the link may be secured for service. The border wall $c$ defines a recess (to which in Fig. 1 the reference numeral $a$ is immediately applied) into which recess the coupling portion $d$ of an identical and adjacent link of an assembly has entrance, and within which fastening engagement of the links is effected. To avoid sharp edges, border $c$ can be beaded inwards to produce edges $e$ by, for example, placing the finally drawn links in a suitably shaped stamping die.

Fastener links produced by this method are considerably more accurate than the substantial punched and stamped links, or links bent from thin sheet, so that with these links a much lighter fastener and therewith good opening and closing is obtained.

It is manifest that the article, formed by deep-drawing from a sheet-metal blank that extends in the basal plane of the finished article, acquires under the stress of formation relatively great rigidity; and it is manifest that, since the stresses of drawing are in the direction in which the links in service are assembled link upon link, minute irregularities of shape, such as inevitably are found in any succession of identically fashioned articles, are of minimum effect to disturb the regularity of assembly in service.

Having now particularly described and ascertained the nature of my said invention and in what manner the same is to be performed, what I claim as new and desire to secure by Letters Patent is:

1. A deep-drawn sheet-metal link for a slide-fastener, including a basal web from which on one side rises medially an elevated coupling portion and on the other side rises peripherally a border wall, such border wall defining a recess complemental to such elevated coupling portion.

2. The structure of claim 1, the border wall having an inturned free edge.

3. A deep-drawn sheet-metal link for a slide-fastener of general U shape, and including a basal web from which on one side and in the bend of the U rises medially an elevated coupling portion and on the other side rises peripherally a border wall, such border wall defining a recess at the bend of the U complemental to the elevated coupling portion.

KURT HENKELS.